(12) United States Patent
Hirata

(10) Patent No.: US 11,475,267 B2
(45) Date of Patent: Oct. 18, 2022

(54) BOOSTER ANTENNA AND PORTABLE TERMINAL STAND

(71) Applicant: Norimitsu Hirata, Fukuoka (JP)

(72) Inventor: Norimitsu Hirata, Fukuoka (JP)

( * ) Notice: Subject to any disclaimer, the term of this patent is extended or adjusted under 35 U.S.C. 154(b) by 818 days.

(21) Appl. No.: 16/341,301

(22) PCT Filed: Oct. 12, 2017

(86) PCT No.: PCT/JP2017/037063
§ 371 (c)(1),
(2) Date: Apr. 11, 2019

(87) PCT Pub. No.: WO2018/070494
PCT Pub. Date: Apr. 19, 2018

(65) Prior Publication Data
US 2021/0151888 A1    May 20, 2021

(30) Foreign Application Priority Data

Oct. 12, 2016  (JP) .............................. JP2016-201104

(51) Int. Cl.
*G06K 19/077* (2006.01)
*G06K 7/10* (2006.01)
(Continued)

(52) U.S. Cl.
CPC ... *G06K 19/07794* (2013.01); *G06K 7/10178* (2013.01); *G06K 7/10336* (2013.01); *H01Q 1/2225* (2013.01); *H04B 5/02* (2013.01)

(58) Field of Classification Search
CPC .......... G06K 7/10158; G06K 7/10178; G06K 7/10297; G06K 7/10316–10356;
(Continued)

(56) References Cited

U.S. PATENT DOCUMENTS

| 6,840,448 B2 | 1/2005 | Fukushima et al. |
| 8,366,009 B2 * | 2/2013 | Finn .................. G06K 19/07769 235/492 |

(Continued)

FOREIGN PATENT DOCUMENTS

| JP | 2005176082 A | 6/2005 |
| JP | 2005339663 A | 12/2005 |

(Continued)

OTHER PUBLICATIONS

English translation of International Preliminary Report on Patentability, dated Apr. 16, 2019, with Written Opinion for PCT/JP2017/037063 filed Oct. 12, 2017.

(Continued)

*Primary Examiner* — Thien M Le
*Assistant Examiner* — April A Taylor
(74) *Attorney, Agent, or Firm* — Paul D. Bianco; Gary S. Winer; Fleit Intellectual Property Law

(57) ABSTRACT

A booster antenna for enabling ID information, code information, or the like to be reliably and easily read from an IC card or the like with a portable terminal without bringing the IC card or the like directly close to the portable terminal. The booster antenna includes: an inner coil wound twice into a circular shape; an outer coil surrounding the outer side of the inner coil and wound twice into a rectangular shape; and a terminal-side coil wound four times into a circular shape. One end of the inner and outer coils are electrically connected to each other. The diameter of the inner coil is 93% or more of the short sides of the outer coil. The booster antenna includes a connection cord connecting the other end of the inner coil and one end of the terminal-side coil and electrically connecting the other end of the outer coil and the other end of the terminal-side coil.

7 Claims, 4 Drawing Sheets

(51) Int. Cl.
  *H01Q 1/22*        (2006.01)
  *H04B 5/02*        (2006.01)
(58) Field of Classification Search
  CPC ....... G06K 19/07773; G06K 19/07775; G06K 19/07777; G06K 19/07779; G06K 19/07781; G06K 19/07794; H01Q 1/2225
  See application file for complete search history.

(56) References Cited

U.S. PATENT DOCUMENTS

| | | | |
|---|---|---|---|
| 9,195,932 B2* | 11/2015 | Finn | G06K 19/07769 |
| 10,461,426 B2* | 10/2019 | Leem | H01Q 1/24 |
| 2013/0075477 A1* | 3/2013 | Finn | H01Q 1/2225 |
| | | | 29/601 |
| 2017/0040105 A1* | 2/2017 | Peralta | H01F 38/14 |

FOREIGN PATENT DOCUMENTS

| | | |
|---|---|---|
| JP | 4058300 B2 | 3/2008 |
| JP | 2014120936 A | 6/2014 |
| JP | 2015091007 A | 5/2015 |
| JP | 2016181163 A | 10/2016 |

OTHER PUBLICATIONS

International Search Report dated Dec. 1, 2017 for PCT/JP2017/037063 filed Oct. 12, 2017.
Written Opinion for PCT/JP2017/037063 filed Oct. 12, 2017.

\* cited by examiner

BOOSTER ANTENNA AND PORTABLE TERMINAL STAND

FIELD

The present invention relates to a booster antenna for eliminating the need of bringing an IC card, an RFID tag, or the like (hereinafter referred to as "IC card or the like") directly close to a reading device when ID information, code information, or the like is read from the IC card or the like by the reading device.

The present invention also relates to a portable terminal stand for enabling ID information, code information, or the like to be more reliably read from an IC card or the like through an information reading antenna included in a portable terminal such as a smartphone and a tablet terminal by using the booster antenna.

BACKGROUND

Conventionally, as disclosed in Patent Literature 1 (JP 4058300 B), a booster coil including antenna coils 32A and 32B in order to increase a communication distance between an external device (reader-writer) and an antenna coil in an IC card module has been known.

CITATION LIST

Patent Literature

Patent Literature 1: JP 4058300 B

SUMMARY

Technical Problem

However, the booster coil (3) in Patent Literature 1 is aimed at increasing a communication distance between an antenna coil (42) in an IC card module that is fixedly provided to a mobile phone terminal (1) and an antenna coil (51) in an external device, and is not aimed at supporting various forms and sizes of IC cards or the like.

If a booster coil having two antenna coils is simply used, there is a problem in that, because IC cards or the like have various sizes, reading accuracy changes depending on the positional relation between one antenna coil and an IC card or the like and information cannot be read from the IC card or the like in some cases.

For reading information on an IC card or the like with a portable terminal, the other antenna coil needs to be located near the position of an information reading antenna in the portable terminal. The position of the antenna is different depending on the type and model of the portable terminal, and hence it is necessary to grasp where the antenna in the portable terminal is in order to hold the other antenna coil at an accurate position.

It is an object of the present invention to enable information to be reliably read from various types of IC cards or the like and enable information on IC cards or the like to be reliably and easily read with a portable terminal.

Solution to Problem

A booster antenna according to claim 1 of the invention includes: an inner coil wound m times (m is a natural number) into a circular, elliptical, or polygonal shape; an outer coil surrounding an outer side of the inner coil and wound n times (n is a natural number) into a parallelogram shape; and a terminal-side coil wound m+n times into a circular, elliptical, or polygonal shape, in which one end of the inner coil and one end of the outer coil are electrically connected to each other, and the booster antenna includes a connection cord electrically connecting another end of the inner coil and one end of the terminal-side coil to each other and electrically connecting another end of the outer coil and another end of the terminal-side coil to each other.

A booster antenna according to claim 2 of the invention includes: an inner coil wound m times (m is a natural number) into a circular, elliptical, or polygonal shape; an outer coil surrounding an outer side of the inner coil and wound n times (n is a natural number) into a parallelogram shape; a first terminal-side coil wound m times into a circular, elliptical, or polygonal shape; a second terminal-side coil wound n times into a circular, elliptical, or polygonal shape; a first connection cord electrically connecting one end of the inner coil and one end of the first terminal-side coil to each other and electrically connecting another end of the inner coil and another end of the first terminal-side coil to each other; and a second connection cord electrically connecting one end of the outer coil and one end of the second terminal-side coil to each other and electrically connecting another end of the outer coil and another end of the second terminal-side coil to each other.

In the invention according to claim 3, in the booster antenna according to claim 1 or 2, a diameter of a circle circumscribing the inner coil is 62% or more and 150% or less of a distance between long sides of the outer coil.

In the invention according to claim 4, the booster antenna according to any one of claims 1 to 3 further includes a rectangular parallelepiped case body housing therein the inner coil and the outer coil and a rectangular parallelepiped card body housing therein the terminal-side coil.

In the invention according to claim 5, in the booster antenna according to claim 4, a sheet-shaped electromagnetic shielding body is provided on at least one of a bottom surface side of the case body and a lower surface side of the card body.

A portable terminal stand according to claim 6 of the invention includes: the booster antenna according to any one of claims 1 to 5; and a holding stand including a portion configured to hold a portable terminal and a portion configured to hold the terminal-side coil at a location that approaches a non-contact communication unit (information reading antenna) of the portable terminal when the portable terminal is held.

A portable terminal stand according to claim 7 of the invention includes: the booster antenna according to any one of claims 1 to 4; and a holding stand including a portion configured to hold a portable terminal and a portion configured to hold the terminal-side coil at a location that approaches a non-contact communication unit (information reading antenna) of the portable terminal when the portable terminal is held, in which a sheet-shaped electromagnetic shielding body is provided to a part or whole of the portion of the holding stand configured to hold the terminal-side coil.

Advantageous Effects of Invention

The booster antenna according to claim 1 of the invention includes: the inner coil wound m times (m is a natural number) into a circular, elliptical, or polygonal shape; the outer coil surrounding the outer side of the inner coil and wound n times (n is a natural number) into a parallelogram shape; and the terminal-side coil wound m+n times into a circular, elliptical, or polygonal shape, in which one end of the inner coil and one end of the outer coil are electrically connected to each other, and the booster antenna includes the connection cord electrically connecting the other end of the inner coil and one end of the terminal-side coil to each other and electrically connect the other end of the outer coil and the other end of the terminal-side coil. Consequently, regardless of the size and the form of an IC card or the like, the IC card or the like can be satisfactorily coupled to a reading device or a portable terminal having a reading function disposed near the terminal-side coil through the inner coil or the outer coil, the connection cord, and the terminal-side coil by simply bringing the IC card or the like into close contact with an appropriate location on the inner side of the outer coil, so that information on the IC card or the like can be reliably read.

The booster antenna according to claim 2 of the invention includes: the inner coil wound m times (m is a natural number) into a circular, elliptical, or polygonal shape; the outer coil surrounding the outer side of the inner coil and wound n times (n is a natural number) into a parallelogram shape; the first terminal-side coil wound m times into a circular, elliptical, or polygonal shape; the second terminal-side coil wound n times into a circular, elliptical, or polygonal shape; the first connection cord electrically connecting one end of the inner coil and one end of the first terminal-side coil to each other and electrically connecting the other end of the inner coil and the other end of the first terminal-side coil to each other; and the second connection cord electrically connecting one end of the outer coil and one end of the second terminal-side coil to each other and electrically connecting the other end of the outer coil and the other end of the second terminal-side coil to each other. Consequently, regardless of the size and the form of an IC card or the like, the IC card or the like can be satisfactorily coupled to a reading device or a portable terminal having a reading function disposed near the first and the second terminal-side coils through the inner coil, the first connection cord, and the first terminal-side coil or through the outer coil, the second connection cord, and the second terminal-side coil by simply bringing the IC card or the like into close contact with an appropriate location on the inner side of the outer coil, so that information on the IC card or the like can be reliably read.

With the booster antenna according to claim 3 of the invention, in addition to the effect by claim 1 or 2 of the invention, the diameter of a circle circumscribing the inner coil is 62% or more and 150% or less of the distance between the long sides of the outer coil. Consequently, the IC card or the like can be more satisfactorily coupled to a reading device or a portable terminal having a reading function through the inner coil, and information on the IC card or the like can be more reliably read.

With the booster antenna according to claim 4 of the invention, in addition to the effect by any one of claims 1 to 3 of the invention, the booster antenna includes a rectangular parallelepiped case body housing therein the inner coil and the outer coil and a rectangular parallelepiped card body housing therein the terminal-side coil. Consequently, by simply placing the IC card or the like at the center of the case body and bringing the card body into close contact to a reading device or a portable terminal having a reading function, the IC card or the like can be satisfactorily coupled to the reading device or the portable terminal.

With the booster antenna according to claim 5 of the invention, in addition to the effect by claim 4 of the invention, a sheet-shaped electromagnetic shielding body is provided on at least one of a bottom surface side of the case body and a lower surface of the card body. Consequently, an IC tag disposed in a gap of material having high magnetic permeability (such as iron) can be satisfactorily read.

The portable terminal stand according to claim 6 of the invention includes: the booster antenna according to any one of claims 1 to 5; and the holding stand including a portion configured to hold a portable terminal and a portion configured to hold the terminal-side coil at a location that approaches a non-contact communication unit of the portable terminal when the portable terminal is held. Consequently, when information on an IC card or the like is read with a portable terminal, by simply setting the terminal-side coil to a designated position on the holding stand, holding the portable terminal to a predetermined position on the holding stand, and bringing the IC card or the like close to an appropriate location on the inner side of the outer coil, the IC card or the like can be satisfactorily coupled to the portable terminal to enable information on the IC card or the like to be reliably and easily read.

The portable terminal stand according to claim 7 of the invention includes: the booster antenna according to any one of claims 1 to 4; and the holding stand including a portion configured to hold a portable terminal and a portion configured to hold the terminal-side coil at a location that approaches a non-contact communication unit of the portable terminal when the portable terminal is held. Consequently, when information on an IC card or the like is read with a portable terminal, by simply setting the terminal-side coil to a designated position on the holding stand, holding the portable terminal to a predetermined position on the holding stand, and bringing the IC card or the like close to an appropriate location on the inner side of the outer coil, the IC card or the like can be satisfactorily coupled to the portable terminal to enable information on the IC card or the like to be reliably and easily read. The sheet-shaped electromagnetic shielding body is provided on a part or whole of the portion of the holding stand configured to hold the terminal-side coil, and hence even when the portable terminal stand is placed on material having high magnetic permeability, information on the IC card or the like can be satisfactorily read by the portable terminal.

DESCRIPTION OF EMBODIMENTS

Embodiments of the present invention are described by way of examples.

First Embodiment

Figure 1:
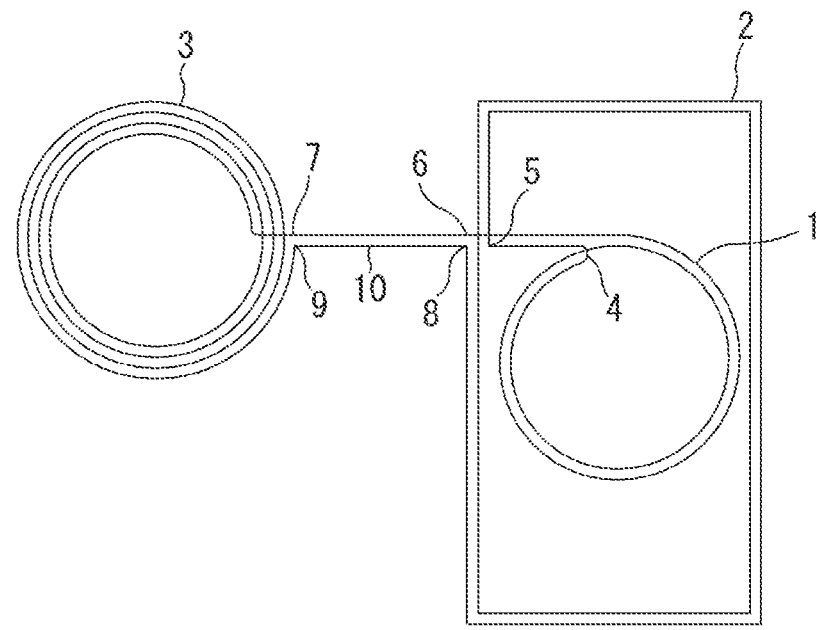
FIG. 1 is a diagram illustrating the structure of a booster antenna according to a first embodiment.

As illustrated in FIG. 1, a booster antenna in a first embodiment includes an inner coil 1 wound twice into a circular shape, an outer coil 2 surrounding the outer side of the inner coil 1 and wound twice into a rectangular shape, and a terminal-side coil 3 wound four times into a circular shape. One end 4 of the inner coil and one end 5 of the outer coil are electrically connected to each other. The booster antenna includes a connection cord 10 electrically connecting the other end 6 of the inner coil and one end 7 of the terminal-side coil to each other and electrically connecting the other end 8 of the outer coil and the other end 9 of the terminal-side coil to each other.

In this case, the inner coil 1 and the outer coil 2 are wound twice and the terminal-side coil is wound four times, but as a result of testing coils having various numbers of turns, the inner coil 1 and the outer coil 2 wound three to eight times and the terminal-side coil wound multiple times thereof functioned most satisfactorily. In principle, it suffices that the inner coil 1 is wound m times (m is a natural number), the outer coil 2 is wound n times (n is a natural number), and the terminal-side coil 3 is wound m+n times.

The diameter of the inner coil 1 is 30 mm. The lengths of the short sides and the long sides of the outer coil 2 are 32 mm and 70 mm, respectively. The diameter of the terminal-side coil 3 is 30 mm.

As a result of testing various dimensions, the inner coil 1 having a diameter of 25 to 35 mm, short sides of 25 to 40 mm (larger than the diameter of the inner coil 1), and long sides of 65 to 75 mm and the terminal-side coil 3 having a diameter of 30 to 50 mm functioned satisfactorily.

The diameter of the inner coil 1 and the lengths of the short sides and the long sides of the outer coil 2 are set in consideration of the sizes of IC cards and RFID tags currently available. The range of dimensions where the booster antenna functions satisfactorily changes if the standard size of an IC card or the like changes in the future.

In principle, it is considered that the dimensions of the inner coil 1 are preferably slightly larger than the dimensions of an antenna coil of a large RFID tag, and the dimensions of the outer coil 2 are preferably slightly larger than the dimensions of an antenna coil of an IC card widely spread.

It is understood from the above-mentioned test results that, at present, the diameter of the inner coil 1 with respect to the length of the short sides of the outer coil 2 is preferably $25/40$ or more, that is, 62% or more, with reference to a maximum length of 40 mm of the short sides, and is more preferably $30/40$ or more, that is, 75% or more, in view of the diameter of the inner coil 1 in the first embodiment.

Furthermore, the diameter of the inner coil 1 with respect to the length of the short sides of the outer coil 2 is preferably $25/32$ or more, that is, 78% or more, with reference to a length of 32 mm of the short sides in the first embodiment, and is more preferably $30/32$ or more, that is, 93% or more, in view of the diameter of the inner coil 1 in the first embodiment.

Second Embodiment

Figure 2:
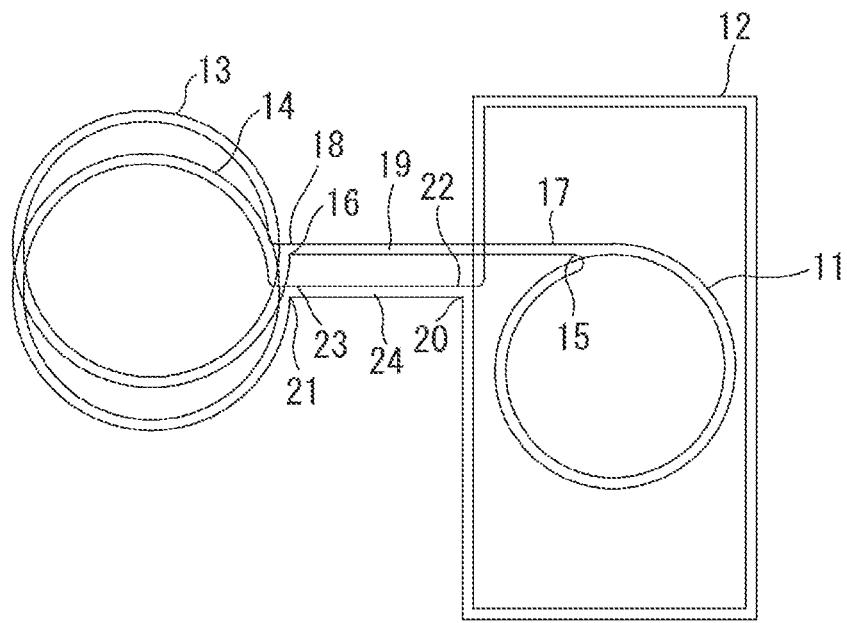
FIG. 2 is a diagram illustrating the structure of a booster antenna according to a second embodiment.

As illustrated in FIG. 2, a booster antenna in a second embodiment includes an inner coil 11 wound twice into a circular shape, an outer coil 12 surrounding the outer side of the inner coil 11 and wound twice into a rectangular shape, a first terminal-side coil 13 wound twice into a circular shape, a second terminal-side coil 14 wound twice into a circular shape, a first connection cord 19 electrically connecting one end 15 of the inner coil and one end 16 of the first terminal-side coil to each other and electrically connecting the other end 17 of the inner coil and the other end 18 of the first terminal-side coil to each other, and a second connection cord 24 electrically connecting one end 20 of the outer coil and one end 21 of the second terminal-side coil to each other and electrically connecting the other end 22 of the outer coil and the other end 23 of the second terminal-side coil to each other.

In this case, the inner coil 11 and the outer coil 12 are wound twice and the terminal-side coils are wound four times, but as in the first embodiment, as a result of testing coils having various numbers of turns, the inner coil 11 and the outer coil 12 wound three to eight times and the first terminal-side coil 13 and the second terminal-side coil 14 wound the same number of times as the inner coil 11 and the outer coil 12, respectively, functioned most satisfactorily. In principle, it suffices that the inner coil 11 and the first terminal-side coil 13 are wound m times (m is a natural number) and the outer coil 12 and the second terminal-side coil 14 wound n times (n is a natural number).

The diameter of the inner coil 11, the lengths of the short sides of the outer coil 12, the lengths of the long sides of the outer coil 12, and the diameter of the terminal-side coil 13 are 30 mm, 32 mm, 70 mm, and 30 mm, respectively, as in the first embodiment. As a result of testing coils having various numbers of turns, the inner coil 11 having a diameter of 25 to 35 mm, the outer coil 12 having short sides of 25 to 40 mm (larger than the diameter of the inner coil 11) and long sides of 65 to 75 mm, and the terminal-side coil 13 having a diameter of 30 to 50 mm functioned satisfactorily.

As described above in the first embodiment, the range of dimensions where the booster antenna functions satisfactorily changes if the standard size of an IC card or the like changes in the future. In principle, it is considered that the dimensions of the inner coil 11 are preferably slightly larger than the dimensions of an antenna coil of a large RFID tag, and the dimensions of the outer coil 12 are preferably slightly larger than the dimensions of an antenna coil of an IC card widely spread.

It is understood from the above-mentioned test results that, at present, as in the first embodiment, the diameter of the inner coil 11 with respect to the length of the short sides of the outer coil 12 is preferably 62% or more and more preferably 75% or more, and is preferably 78% or more and more preferably 93% or more with reference to a length 32 mm of the short sides.

Figure 3:
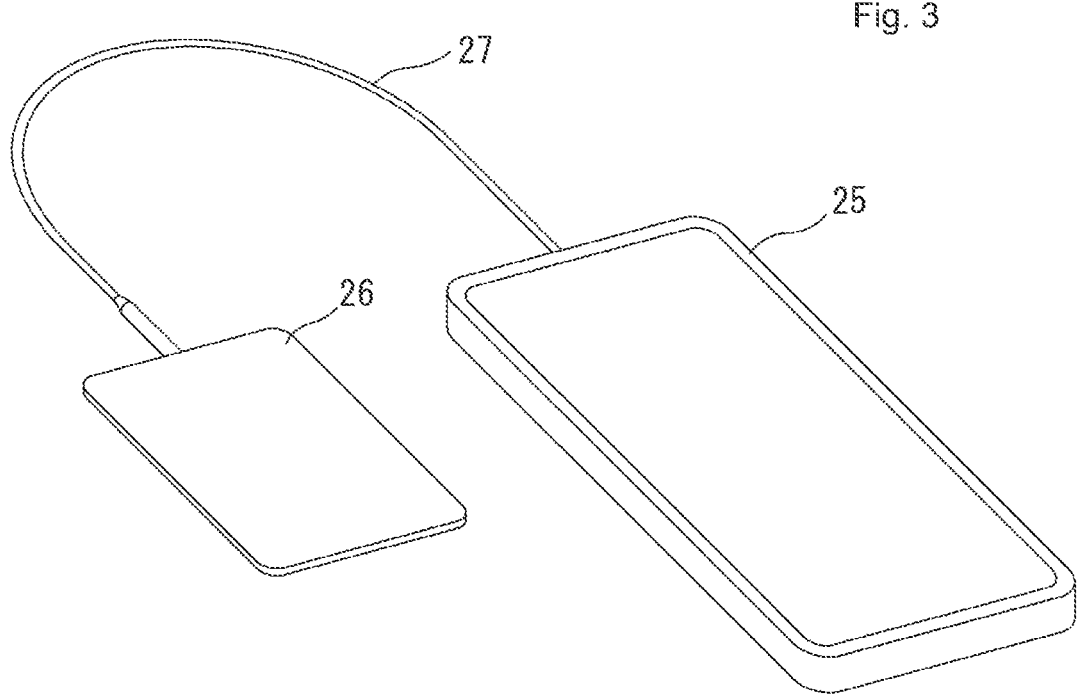
FIG. 3 is a diagram illustrating how the booster antenna in the present invention is sold and provided in general.

FIG. 3 is a diagram illustrating how the booster antenna in the first or second embodiment is sold and provided in general. The inner coil 1 and the outer coil 2 in the first embodiment or the inner coil 11 and the outer coil 12 in the second embodiment are housed in a rectangular parallelepiped case body 25, the terminal-side coil 3 in the first embodiment or the first terminal-side coil 13 and the second terminal-side coil 14 in the second embodiment are housed in a rectangular parallelepiped card body 26, and connection lines of the connection cord 10 in the first embodiment or the first connection cord 19 and the second connection cord 24 in the second embodiment are housed in a connection body 27 while being insulated.

The rectangular parallelepiped case body 25 includes: a box having two or more projections or annular protruding portions at the center of the bottom surface in order to fix the inner coil 1 in the first embodiment or the inner coil 11 in the second embodiment such that the inner coil does not move inside the case body and having two or more projections or annular protruding portions on the periphery of the bottom surface in order to fix the outer coil 2 in the first embodiment or the outer coil 12 in the second embodiment such that the outer coil does not move inside the case body; and a lid that covers the top surface of the box.

The lid may be removably provided to the box by using a screw, or may be provided so as not to be removed from the box by using adhesive.

The material is resin in general, but can be appropriately selected from materials having low magnetic permeability, such as wood, ceramics, and paper.

The size is 70 mm for short sides and 140 mm for long sides, but any size can be used as long as the outer coil 2 or 12 can be housed inside.

Guidance indication indicating a position suitable for setting an IC card or the like is provided on the top surface of the lid. For example, for an IC card widely spread, an enclosure line having substantially the same shape as the IC card may be displayed at the center, and for a compact IC tag such as an RFID tag, an appropriate figure or character may be displayed at a position close to the center of a location where the inner coil 1 or 11 is disposed.

Furthermore, a letter or Braille for guidance may be provided in addition to or in place of the above-mentioned indication.

The rectangular parallelepiped card body 26 includes: a housing member in which a recess portion for housing the terminal-side coil 3 in the first embodiment or the first terminal-side coil 13 and the second terminal-side coil 14 in the second embodiment is provided at the center; and a cover that covers the recess portion.

The cover may be removably fixed to the housing member by using a screw, or may be fixed so as not to be removed from the housing member by using adhesive.

The material is resin in general, but can be appropriately selected from materials having low magnetic permeability, such as wood, ceramics, and paper.

The size is 54 mm for short sides and 85 mm (size of IC cards widely spread) for long sides, but any size can be used as long as the terminal-side coil 3 or the first terminal-side coil 13 and the second terminal-side coil 14 can be housed inside.

Special guidance indication is not required to be provided on the top surface of the cover. However, to improve the convenience for use where the card body 26 is brought close to the portable terminal, it is more preferred that guidance indication such as figures and characters be provided such that an information reading antenna position for each type and model of portable terminal can be recognized.

In general, a general two-core wire is used for the connection body 27 in the first embodiment, and a general four-core line is used for the connection body 27 in the second embodiment, but two two-core wires may be used in the second embodiment. The reading accuracy further improves when a twisted pair cable obtained by stranding two electric wires is used instead of a general two-core line.

Third Embodiment

A portable terminal stand in a third embodiment enables information to be reliably and easily read without special knowledge for use where the terminal-side coil 3 in the first embodiment or the first terminal-side coil 13 and the second terminal-side coil 14 in the second embodiment are brought close to an information reading antenna in the portable terminal and an IC card or the like is brought close to the inner coil 1 or 11 and the outer coil 2 or 12 such that information on the IC card or the like is read by the portable terminal.

Figure 4:
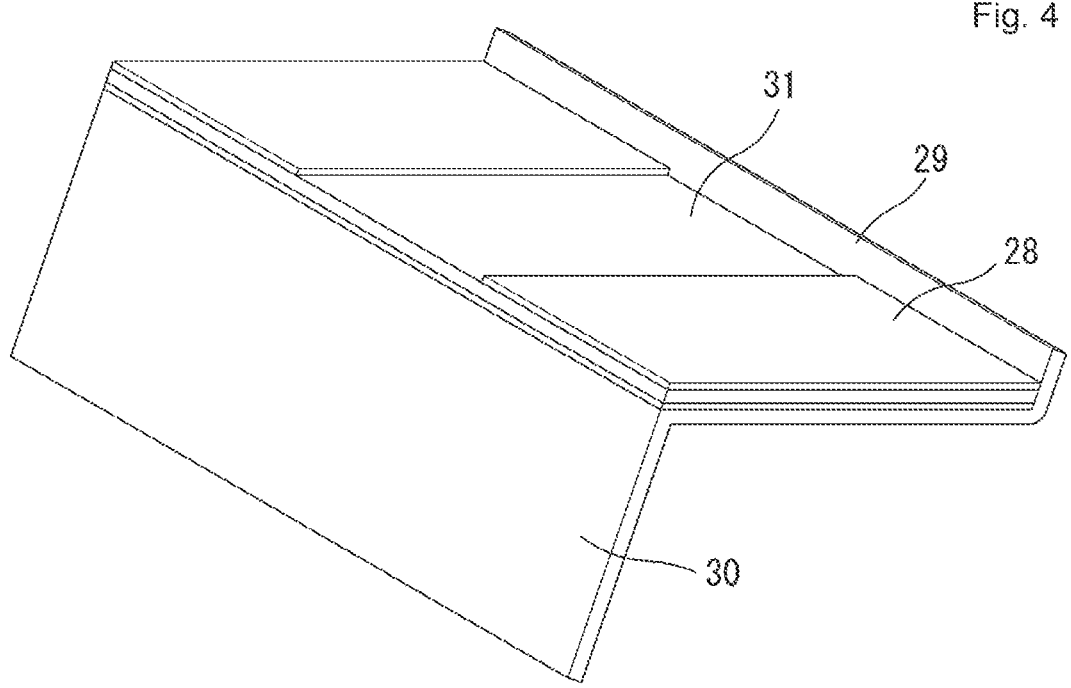
FIG. 4 is a perspective view of a portable terminal stand according to a third embodiment.

As illustrated in FIG. 4, the portable terminal stand in the third embodiment includes, as a major component, a holding stand configured by a flat plate 28 having a size slightly larger than the portable terminal, a protruding portion 29 that protrudes upward from a lower end portion of the flat plate 28, a display plate 30 extending downward from an upper end portion of the flat plate 28, and a recess portion 31 that receives the card body 26 illustrated in FIG. 3 at substantially the center of the flat plate 28. The booster antenna in the first or second embodiment is set on the holding stand.

The top surface of the flat plate 28 and the protruding portion 29 serve as a portion configured to hold the portable terminal, and the recess portion 31 is formed at a position that is opposed to an information reading antenna of the portable terminal when the portable terminal is held so as to overlap the top surface of the flat plate 28.

Thus, when the card body 26 is held in the recess portion 31, the information reading antenna and the terminal-side coil 3 in the first embodiment or the first terminal-side coil 13 and the second terminal-side coil 14 in the second embodiment are disposed to be opposed to each other. Consequently, when an IC card or the like is set at an appropriate position on the case body 25, the IC card or the like and the portable terminal are satisfactorily coupled, and information on the IC card or the like can be reliably and easily read.

It is assumed in the third embodiment that the portable terminal having the same position of the information reading antenna (in general, the same model of portable terminal) is held on the holding stand, and hence a holding stand having a different position of the recess portion 31 is prepared for a portable terminal having a different position of the information reading antenna.

In such a case, if portable terminals to be used are not standardized, a large number of holding stands need to be prepared. Thus, in order to support portable terminals having different positions of information reading antennas, a plate-shaped member in which a cutout portion slightly wider than the short sides of the card body 26 is provided may be used on the top surface of the flat plate 28 without providing a recess portion on the top surface of the flat plate 28.

Specifically, by preparing a plurality of types of plate-shaped members having different positions of cutout portions, selecting a plate-shaped member corresponding to a portable terminal to be held and placing or fixing the plate-shaped member onto the top surface of the flat plate 28, and holding the card body 26 by a recess portion formed by the top surface of the flat plate 28 and the cutout portion, various models of portable terminals can be supported, with the main body portion of the holding stand unchanged.

Instead of the plate-shaped member provided with the cutout portion, two plate-shaped members may be fixed to the top surface of the flat plate 28 with a distance slightly larger than the short sides of the card body 26.

Fourth Embodiment

Figure 5:
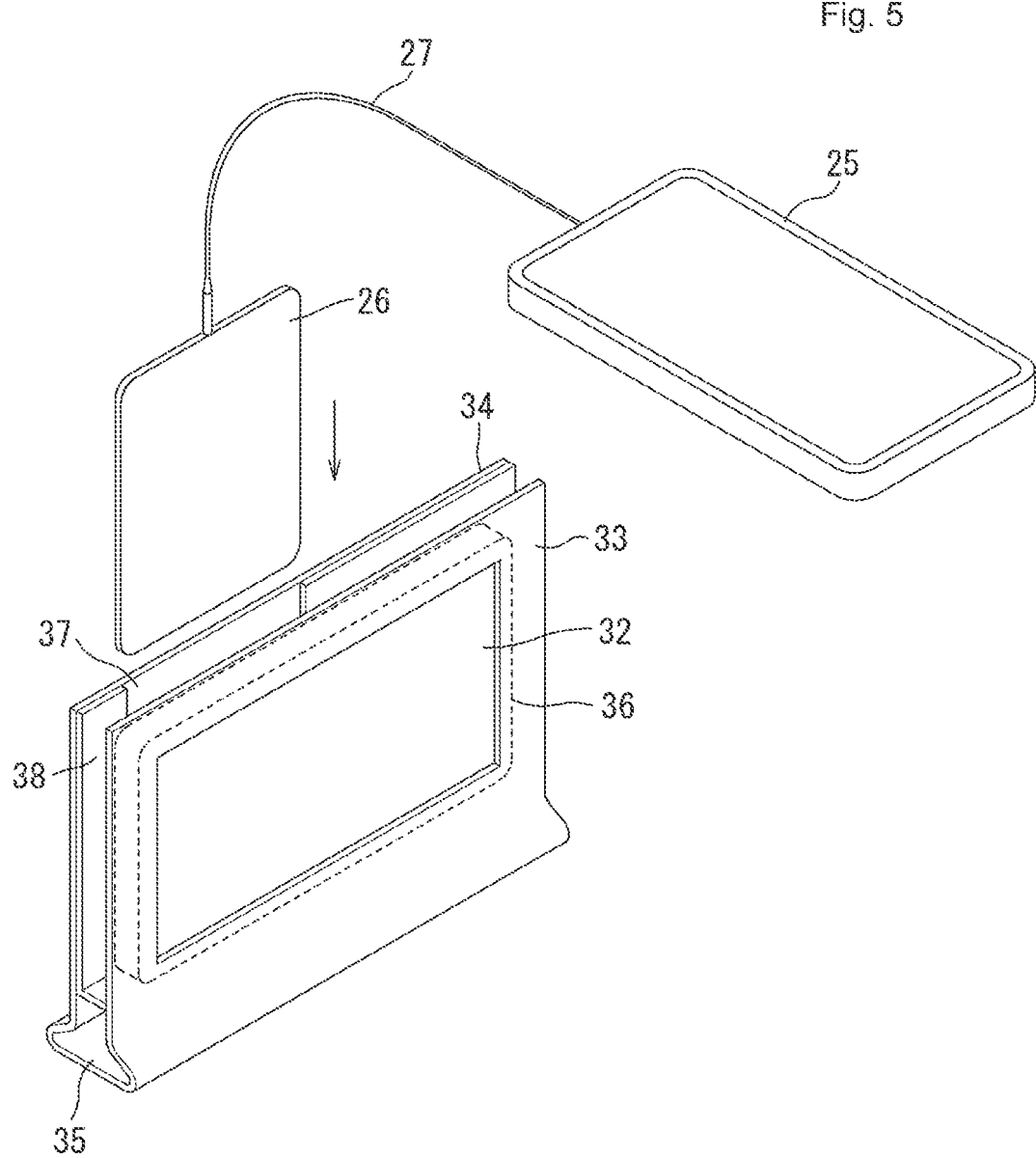
FIG. 5 is a perspective view of a portable terminal stand according to a fourth embodiment.

As illustrated in FIG. 5, a portable terminal stand in a fourth embodiment includes, as a basic configuration, a front plate 33 formed from a flat plate having a through-hole portion 32, a back plate 34 formed from a flat plate provided substantially in parallel to the front plate 33, and a base portion 35 configured to hold the front plate 33 and the back plate 34 perpendicularly to a placement surface.

A portable terminal 36 can be held by being inserted between the front plate 33 and the back plate 34. With the portable terminal 36 held, a display screen of the portable terminal 36 can be visually recognized through the through-hole portion 32. As necessary, the display screen can be touched to input operation.

As illustrated in FIG. 5, a plate-shaped member 38 in which a cutout portion 37 for allowing the card body 26 to be inserted to a predetermined position between the back plate 34 and the portable terminal 36 is provided on the upper side is bonded to the front side of the back plate 34 of the portable terminal stand in the fourth embodiment.

The cutout portion 37 has a rectangular shape having a width slightly larger than that of the card body 26. The cutout portion 37 is provided at a location corresponding to a position at which the terminal-side coil 3 or the first terminal-side coil 13 and the second terminal-side coil 14 inside the card body 26 are opposed to an information reading antenna when the card body 26 is inserted.

Thus, when the card body 26 is inserted to the cutout portion 37, the information reading antenna and the terminal-side coil 3 in the first embodiment or the first terminal-side coil 13 and the second terminal-side coil 14 in the second embodiment are disposed so as to be opposed to each other. Consequently, by setting an IC card or the like to an appropriate position on the case body 25 as in the third embodiment, the IC card or the like is satisfactorily coupled to a portable terminal, and information on the IC card or the like can be reliably and easily read.

For providing the cutout portion 37, a method of cutting a plate-shaped member having no cutout portion by a cutter or a method of providing a plurality of cutouts with intervals of about ½ to ⅕ of the width of the card body 26 in advance from the upper side to the lower side of the plate-shaped member and forming a groove on the lower side of the plate-shaped member and using the groove to break off a strip-shaped part between two cutouts at an appropriate position can be employed.

The plate-shaped member 38 has an L shape in which the protruding portion is formed at the lower end portion, and the protruding portion has a length equal to or larger than the maximum thickness of the portable terminal 36.

Although not illustrated, a hole or a cutout is provided at an appropriate position on the L-shaped protruding portion, and a hole is also provided at an appropriate position on the bottom or side surface of the base portion 35, so that a wire fixed to the portable terminal 36 is allowed to pass through the holes.

In this manner, by fixing one end of the wire to the placement surface itself of the portable terminal stand or a projection or a hole provided near the placement surface, the portable terminal and the portable terminal stand can be prevented from being easily taken away.

How the booster antennas in the first and the second embodiments and the booster antenna illustrated in FIG. 3 are sold and provided in general and modifications of the portable terminal stands in the third and the fourth embodiments are described.

(1) The first to the fourth embodiments have been described on the assumption that ID information or code information is read from an IC card or the like by a reading device or a portable terminal, but the booster antenna in the present invention can also be used to write various kinds of information in an IC card or the like.

(2) The first and the second embodiments have been described on the assumption that a coil obtained by winding electric wires is used, but a coil may be formed by printing a conductive pattern on a substrate.

(3) In the first and the second embodiments, the inner coils 1 and 11, the terminal-side coil 3, the first terminal-side coil 13, and the second terminal-side coil 14 are circular, and the outer coils 2 and 12 are rectangular.

The inner coils 1 and 11 are not limited to a circular shape but may be an elliptical shape or a polygonal shape as long as the size is slightly larger than an antenna coil of an RFID tag or the like. The outer coils 2 and 12 are not limited to a rectangular shape and may be a quadrangular shape (in general, parallelogram shape) as appropriate as long as the size is slightly larger than an antenna coil of an IC card.

In the case where the inner coil has an elliptical shape or a polygonal shape, the diameter of the inner coils 1 and 11 in the first and the second embodiments is replaced with the diameter of a circle circumscribing the inner coil. In the case where the outer coil has a parallelogram shape, the length of the short sides of the outer coils 2 and 12 in the first and the second embodiments is replaced with a distance between the long sides of the outer coil.

In the case where the inner coil has a circular shape as in the first and the second embodiments, the inner coil is surrounded by the rectangular (parallelogram) outer coil and hence the upper limit of the diameter of the inner coil is 100% of the length of the short sides of the outer coil (distance between long sides of outer coil), but in the case where the inner coil has an elliptical shape or a polygonal shape, the diameter of a circle circumscribing the inner coil is not necessarily required to be smaller than the distance between the long sides of the outer coil.

In consideration that the maximum length of the short sides of the outer coil 12 described in the first embodiment is 40 mm and the minimum length of the long sides thereof is 65 mm, the upper limit of the diameter of the circle circumscribing the inner coil in such cases only needs to be 162% or less of the length of the short sides of the outer coil (distance between long sides of outer coil), but is 150% or less in practice and preferably 125% or less.

(4) In the first and the second embodiments, the center of the inner coils 1 and 11 and the center of the outer coils 2 and 12 (intersection of two diagonals) are aligned with each other, but the inner coils 1 and 11 may be disposed anywhere on the inner side of the outer coils 2 and 12.

In the case where the inner coil 1 or 11 is disposed while being greatly shifted, when the booster antenna is sold and provided in general, it is preferred that an appropriate figure, character, letter, or Braille displayed at a position close to the location where the inner coil 1 or 11 is disposed be easy for a user to understand such that a compact IC tag can be disposed.

(5) In the description of how the booster antenna illustrated in FIG. 3 is sold and provided in general, the bottom surface of the box is provided with projections or an annular protruding portion for fixing the inner coil 1 and the outer coil 2 or the inner coil 11 and the outer coil 12 such that the inner coil and the outer coil do not move inside the case body, and the center of the housing member is provided with a recess portion for housing therein the terminal-side coil 3 or the first terminal-side coil 13 and the second terminal-side coil 14. Instead, the box may be provided with a recess portion for housing therein the inner coil 1 and the outer coil 2 or the inner coil 11 and the outer coil 12, and the housing member may be provided with projections or an annular protruding portion for fixing the terminal-side coil 3 or the first terminal-side coil 13 and the second terminal-side coil 14.

Furthermore, the coils may be fixed to the box and the housing member by using an appropriate member, such as adhesive, pressure-sensitive tape, a screw, and a fixation tool having double-sided pressure-sensitive tape, without using projections, an annular protruding portion, or a recess portion.

(6) The case body 25 for the booster antenna illustrated in FIG. 3 is configured such that the inner coil and the outer coil are fixed to the bottom surface of the box and the top surface of the box is covered by the lid, and the card body 26 is configured such that the terminal-side coil is housed at the center of the housing member and the top surface of the housing member is covered by the cover. Instead, as illustrated in FIG. 6, a sheet-shaped electromagnetic shielding body 39 that covers the entire fixed outer coil may be provided on the bottom surface side of the case body 25.

Figure 6:
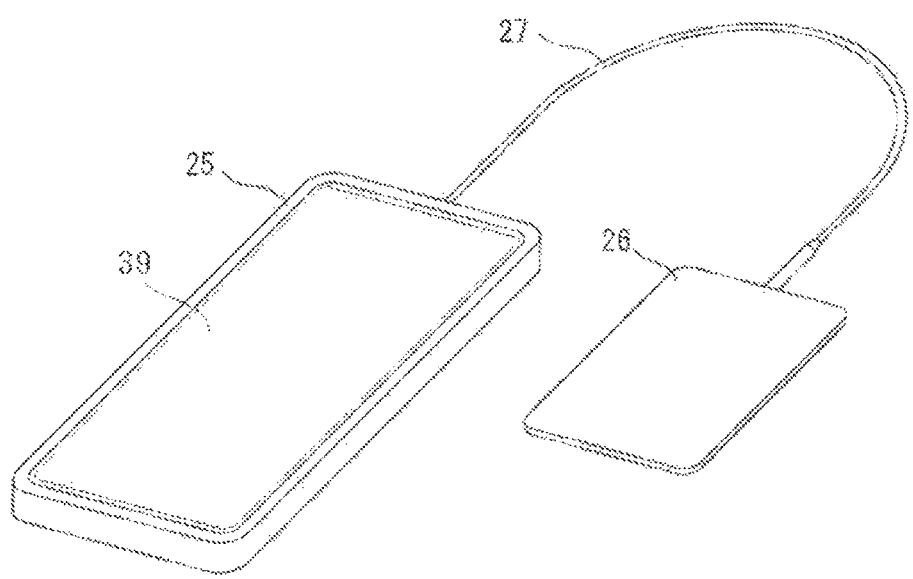
FIG. 6 is a diagram illustrating the structure of a booster antenna according to a modification (6).

In FIG. 6, the electromagnetic shielding body 39 is provided on the outer side of the bottom surface of the box, but may be provided on the inner side of the bottom surface of the box (between bottom surface of box and inner coil and outer coil).

Figure 7:
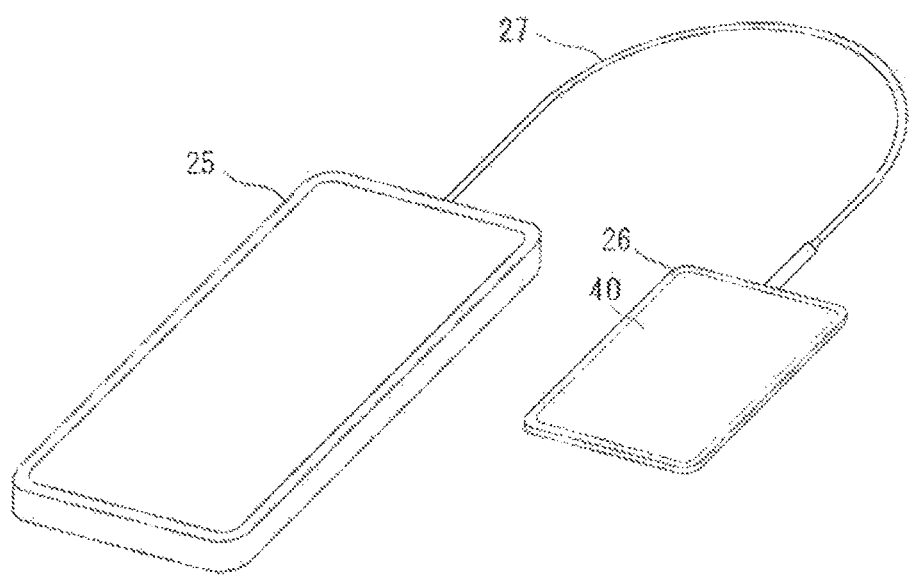
FIG. 7 is a diagram illustrating the structure of the booster antenna according to the modification (6).

As illustrated in FIG. 7, a sheet-shaped electromagnetic shielding body 40 that covers the entire housed terminal-side coil may be provided on the lower surface side of the card body 26.

Furthermore, in FIG. 7, the electromagnetic shielding body 40 is provided on substantially the entire surface on the outer side of the lower surface of the housing member, but may be provided on the inner side of the lower surface of the housing member (between lower surface of housing member and terminal-side coil). In the case where the card body 26 is held on the recess portion 31 of the portable terminal stand illustrated in FIG. 4 for use, the electromagnetic shielding body 40 may be provided only on the distal end side of the card body 26 (only ¼ to ½ from distal end).

(7) The card body 26 in the portable terminal stand in the third embodiment is held on the recess portion 31, and the card body 26 in the portable terminal stand in the fourth embodiment is inserted to the cutout portion 37. Instead, an IC card instead of the card body 26 may be held on the recess portion 31 or inserted to the cutout portion 37 such that information can be directly read from the IC card.

(8) The portable terminal stand in the third embodiment is structured such that a portable terminal is held by using the top surface of the flat plate 28 and the protruding portion 29, and hence the portable terminal can be removed from the holding stand at all times, which is convenient when a phone call is made. Instead, the portable terminal or the portable terminal stand can be easily taken away.

Thus, as in the fourth embodiment described above, a hole may be provided at an appropriate position on the flat plate 28 or the protruding portion 29, and one end of a wire fixed to the portable terminal may be fixed to a projection or a hole provided on the placement surface itself of the portable terminal stand or near the placement surface while the wire passes through the hole such that the portable terminal and the portable terminal stand can be prevented from being easily taken away.

(9) In the portable terminal stand in the third embodiment, the recess portion 31 is fixedly provided to the flat plate 28, or the recess portion 31 is not necessarily provided to the flat plate 28 and a plurality of types of plate-shaped members or two plate-shaped members having different positions of cutout portions may be placed or fixed onto the top surface of the flat plate 28. Instead, as described in the fourth embodiment, a method of cutting a plate-shaped member having no cutout portion by a cutter or a method of providing cutouts from the upper side of the plate-shaped member toward the lower side thereof and forming a groove on the lower side of the plate-shaped member and using the groove to break off a strip-shaped part between two cutouts at an appropriate position may be used to form a cutout portion such that the plate-shaped member is placed or fixed to the flat plate 28.

(10) In the portable terminal stand in the third embodiment, the recess portion 31 is provided to the top surface of the flat plate 28 or a plate-shaped member is placed or fixed on the top surface of the flat plate 28, and in the portable terminal stand in the fourth embodiment, the plate-shaped member 38 is bonded to the front side of the back plate 34. Instead, in the third embodiment, a portion configured to hold the card body 26 or the terminal-side coil may be provided to the lower surface of the flat plate 28, and in the fourth embodiment, a portion configured to hold the card body 26 or the terminal-side coil may be provided on the back side of the back plate 34.

Examples of the portion configured to hold the card body 26 or the terminal-side coil include, irrespective of whether the top surface side or the lower surface side of the flat plate 28 and whether the front side or the back side of the back plate 34, a U-shaped or square-shaped box having an insertion port on the upper side or lateral side, a clip-shaped or L-shaped grip for holding the card body 26 or the terminal-side coil by sandwiching the card body 26 or the terminal-side coil by elastic force, a recess portion or a projection for fixing the card body 26 or the terminal-side coil by fitting, and a hook, a projection, or an annular protruding portion for fixing the card body 26 or the terminal-side coil by hooking.

When the card body 26 is fixed by hooking, a hole or a slit hole for receiving a hook or a projection needs to be provided on the card body 26.

(11) In the portable terminal stand in the third embodiment, the recess portion 31 is provided to only the top surface of the flat plate 28, but it is more preferred that an electromagnetic shielding body be provided on the entire surface or only the lower side of the recess portion 31 (only about ¼ to ½ from lower end) such that the portable terminal stand is not affected by the influence of material having high magnetic permeability when the portable terminal stand is placed on material having high magnetic permeability.

(12) The front plate 33 in the fourth embodiment has the through-hole portion 32, but the through-hole portion 32 may be replaced with a transparent portion or a cutout portion.

In the case where a transparent portion is used, when it is necessary to touch the display screen of the portable terminal 36 to perform input operation, a transparent sheet made of appropriate thin material that does not hinder the input operation is used for a transparent portion at least in a region that needs to be touched.

(13) The through-hole portion 32 in the fourth embodiment has substantially the same size as a display screen of the portable terminal 36, but the through-hole portion only needs to be provided to only a portion where indication necessary for inputting ID information, code information, or the like to the portable terminal 36 from an IC card or the like is viewed and a portion that needs to be touched when it is necessary to touch the display screen to perform input operation.

In this manner, an erroneous operation can be prevented.

(14) The back plate 34 in the fourth embodiment does not have a through-hole portion or a cutout portion, but a through-hole portion or a cutout portion may be appropriately provided as long as the card body 26 can be held at a fixed position when the card body 26 is inserted.

(15) The base portion 35 in the fourth embodiment holds the front plate 33 and the back plate 34 so as to be perpendicular to the placement surface, but may hold the front plate 33 and the back plate 34 at an appropriate angle with the placement surface, or a swinging mechanism may be provided so as to change the angle with the placement surface.

(16) The plate-shaped member 38 in which the cutout portion 8 slightly wider than the card body 26 is provided on the upper side is bonded to the front side of the back plate 34 in the fourth embodiment, but the cutout portion 8 may be provided on the lateral side such that the card body 26 can be inserted from the side.

Two plate-shaped members may be bonded to the front side of the back plate 34 with a distance slightly larger than the width of the card body 26. When two plate-shaped members are arranged and bonded side by side, a hole or a cutout provided at an appropriate position on the protruding portion 9 is not necessarily required.

(17) The plate-shaped member 38 is bonded to the front side of the back plate 34 in the fourth embodiment, but may be welded instead of being bonded or may be fixed by providing fixation means such as hook-and-loop fasteners to the front side of the back plate 34 and the back side of the plate-shaped member 38.

The periphery of the plate-shaped member 38 may be fixed by pressure-sensitive tape or a clip, or may be fixed by a screw from the back side of the back plate 34.

The same applies to the case where the plate-shaped member is fixed to the top surface of the flat plate 28 in the third embodiment.

(18) The plate-shaped member 38 in the fourth embodiment has an L shape in which the protruding portion is provided at the lower end portion thereof, but the protruding portion may be eliminated.

(19) In the fourth embodiment and the above-mentioned modifications (9) and (12) to (15), the plate-shaped member or the holding portion is provided to the back plate 34, but the plate-shaped member or the holding portion may be provided to the front plate 33 when the plate-shaped member or the holding portion is transparent or when the position at which the plate-shaped member or the holding portion is provided is out of a region where indication necessary for inputting ID information, code information, or the like to the portable terminal 36 is displayed.

Even if necessary indication cannot be viewed when the card body 26 is held, no particular problem occurs because the card body 26 only needs to be removed after ID information or the like is input to the portable terminal 36.

REFERENCE SIGNS LIST 1 inner coil, 2 outer coil, 3 terminal-side coil, 4 one end of inner coil, 5 one end of outer coil, 6 other end of inner coil, 7 one end of terminal-side coil, 8 other end of outer coil, 9 other end of terminal-side coil, 10 connection cord, 11 inner coil, 12 outer coil, 13 first terminal-side coil, 14 second terminal-side coil, 15 one end of inner coil, 16 one end of first terminal-side coil, 17 other end of inner coil, 18 other end of first terminal-side coil, 19 first connection cord, 20 one end of outer coil, 21 one end of second terminal-side coil, 22 other end of outer coil, 23 other end of second terminal-side coil, 24 second connection cord, 25 case body, 26 card body, 27 connection body, 28 flat plate, 29 protruding portion, 30 display plate, 31 recess portion, 32 through-hole portion, 33 front plate, 34 back plate, 35 base portion, 36 portable terminal, 37 cutout portion, 38 plate-shaped member, 39, 40 electromagnetic shielding body

The invention claimed is:

1. A booster antenna, comprising:
   an inner coil wound m times (m is a natural number) into a circular, elliptical, or polygonal shape;
   an outer coil surrounding an outer side of the inner coil and wound n times (n is a natural number) into a parallelogram shape; and
   a terminal-side coil wound m+n times into a circular, elliptical, or polygonal shape, wherein
   one end of the inner coil and one end of the outer coil are electrically connected to each other, and
   the booster antenna includes a connection cord electrically connecting another end of the inner coil and one end of the terminal-side coil to each other and electrically connecting another end of the outer coil and another end of the terminal-side coil to each other.

2. The booster antenna according to claim 1, wherein a diameter of a circle circumscribing the inner coil is 62% or more and 150% or less of a distance between long sides of the outer coil.

3. The booster antenna according to claim 1, further comprising a rectangular parallelepiped case body housing therein the inner coil and the outer coil and a rectangular parallelepiped card body housing therein the terminal-side coil.

4. The booster antenna according to claim 3, wherein a sheet-shaped electromagnetic shielding body is provided on at least one of a bottom surface side of the case body and a lower surface side of the card body.

5. A portable terminal stand, comprising:
   the booster antenna according to claim 1; and
   a holding stand including a portion configured to hold a portable terminal and a portion configured to hold the terminal-side coil at a location that approaches a non-contact communication unit of the portable terminal when the portable terminal is held.

6. A portable terminal stand, comprising:
   the booster antenna according to claim 1; and
   a holding stand including a portion configured to hold a portable terminal and a portion configured to hold the terminal-side coil at a location that approaches a non-contact communication unit of the portable terminal when the portable terminal is held, wherein
   a sheet-shaped electromagnetic shielding body is bonded to a part or whole of the portion of the holding stand configured to hold the terminal-side coil.

7. A booster antenna, comprising:
   an inner coil wound m times (m is a natural number) into a circular, elliptical, or polygonal shape;
   an outer coil surrounding an outer side of the inner coil and wound n times (n is a natural number) into a parallelogram shape;
   a first terminal-side coil wound m times into a circular, elliptical, or polygonal shape;
   a second terminal-side coil wound n times into a circular, elliptical, or polygonal shape;
   a first connection cord electrically connecting one end of the inner coil and one end of the first terminal-side coil to each other and electrically connecting another end of the inner coil and another end of the first terminal-side coil to each other; and a second connection cord electrically connecting one end of the outer coil and one end of the second terminal-side coil to each other and electrically connecting another end of the outer coil and another end of the second terminal-side coil to each other.

* * * * *